United States Patent

[11] 3,552,356

[72] Inventor Dolores Rosenthal
      1284 Havenhurst Drive, Los Angeles, Calif. 90046
[21] Appl. No. 785,161
[22] Filed Dec. 19, 1968
[45] Patented Jan. 5, 1971

[54] PET AMUSEMENT DEVICE
     11 Claims, 5 Drawing Figs.
[52] U.S. Cl. .................................................. 119/1,
                                                              119/29
[51] Int. Cl. ........................................... A01k 01/00
[50] Field of Search ........................................... 119/1, 19,
                                                           29, 15; 43/131

[56]                    References Cited
                    UNITED STATES PATENTS
2,292,540   8/1942   Norton ........................... 119/1

2,741,223   4/1956   Winborn, Jr. .................. 119/1
2,977,711   4/1961   Starr ............................. 43/131

*Primary Examiner*—Hugh R. Chamblee
*Attorney*—Roger A. Marrs

ABSTRACT: A pet amusement device is disclosed herein having four contiguous sidewalls defining a central cavity and joined together at one end by a base having a central opening formed therein. Each of the sidewalls is formed with semicircular openings cut along the edge of the sidewalls respectively, which serve as passageways from the exterior of the device to the internal cavity. A floor partition is insertably disposed in the cavity having a perimeter in frictional engagement with the inner surfaces of the sidewalls and having integrally formed risers carried on the opposite ends thereof operable as spacers to raise the partition above the base when so disposed.

PATENTED JAN 5 1971
3,552,356
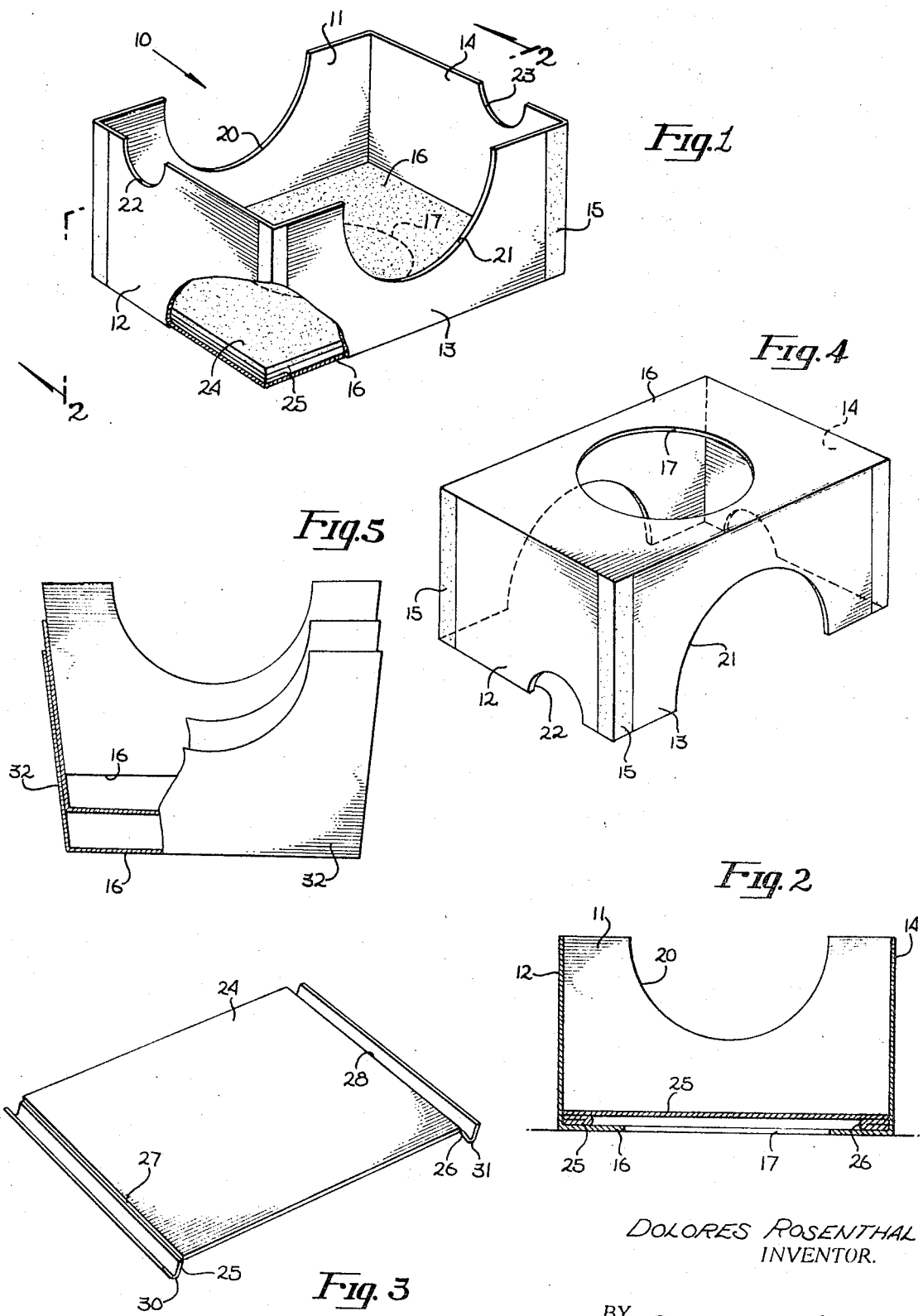

01
PET AMUSEMENT DEVICE

BACKGROUND OF THE INVENTION

1. Field of the Invention

This invention relates to amusement devices for the class of animals commonly referred to as "pets" and, more particularly, to a novel pet amusement device having alternate positions adapted to serve as a pet play den in one position and a pet bed in the other position.

2. Description of the Prior Art

In the pet industry, many attempts have been made to provide amusing and entertaining devices for pets. Generally, these devices take the form of small playthings or articles which are adapted to be cuffed or pawed by the pet in an effort to entertain and amuse the pet. In other instances, a semienclosed structure is provided which may be employed by the pet for sleeping or lounging purposes and generally, the pet playthings are placed inside the enclosure for the amusement of the pet. In this latter instance, the pet may use the enclosure for sleeping purposes or for engaging in playful activity by cuffing or pawing pieces of string or other articles which are drawn about the edge of the semienclosure.

In this latter instance, the semienclosure, when employed for amusement purposes, falls short of success in that the sidewalls of the enclosure are generally sufficiently raised from the floor of the enclosure so that the pet must stretch or assume extremely awkward positions in order to play along the edge thereof. Furthermore, when the enclosure is used as a bed, a cushion of great thickness must be employed in order to separate the animal on the cushion from the chill and dampness of the floor on which the enclosure rests. Such a construction causes the sidewalls of the enclosure to be considerably higher than is necessary and further reduces the utility of the enclosure for other pet amusement purposes.

A further disadvantage encountered with conventional pet amusement devices resides in the fact that the devices fail to take into account the natural desire of pets to hide, stalk or conceal themselves as a play article, such as a string, is drawn about the device which may stimulate the curiosity of the pet.

Therefore, a need has long existed to provide a versatile pet amusement device capable of amusing the pet for extended periods of time and that may also serve as a bed or lounge for the animal. It is to be understood that although animals such as pets are described herein, this terminology can be extended to include all forms of domestic animals and is not to be limited to dogs, cats or the like.

SUMMARY OF THE INVENTION

Accordingly, the problems and difficulties encountered with prior pet amusement devices are obviated by the present invention which provides an enclosure defined by four sidewalls arranged normally with respect to each other so as to define an internal cavity. The sidewalls are coupled to a base having a central opening therethrough adapted to accommodate ingress or egress of the animal to and from the internal cavity. Each of the sidewalls is provided with a semicircular cutout extending along the free edge thereof which may be used for passage of the animal per se through the sidewall or which is adapted to accommodate an extremity of the animal such as an arm, leg, paw or the like. By employing a floor partition having spacers integrally formed on the opposite ends thereof and by inserting the partition into the cavity so that the spacers rest on the base, an insulated floor partition is provided so that the animal may use the device as a bed whereby chill or dampness radiating from the floor is greatly reduced or completely avoided.

Another embodiment of the present invention provides that the sidewalls be tapered so that a plurality of devices may be readily stacked with respect to one another for storage or shipment purposes.

Therefore, it is a primary object of the present invention to provide a novel pet amusement device having contiguous sidewalls defining an internal cavity and formed with a plurality of openings in the sidewalls to accommodate the body of the animal or one of its extremities for amusement purposes.

Another object of the present invention is to provide a novel pet amusement device having alternate positions to function as an amusement play den and as a bed.

Still another object of the present invention is to provide a novel pet amusement device capable of sustaining the interest of the animal for prolonged periods of time and which is designed and constructed to be appealing to the senses and natural ability of the animal.

Yet another object of the present invention is to provide a novel pet amusement device which is readily transportable in a stacked arrangement.

A further object of the present invention is to provide a pet amusement device having contiguous sidewalls incorporating a plurality of openings of various sizes adapted to selectively pass the body of the animal through the sidewall or of a reduced size adapted to accommodate the paw or leg of the animal for playful purposes.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a perspective view of the pet amusement device of the present invention illustrating a corner portion broken away to show a raised floor partition when employed as an animal bed;

FIG. 2 is a cross-sectional view of the pet amusement device as taken in the direction of arrows 2—2 thereof;

FIG. 3 is a perspective view of the floor partition employed in the device of FIGS. 1 and 2;

FIG. 4 is a perspective view of the pet amusement device when employed as an animal play den or device; and FIG. 5 is a side elevational view, partially broken away, of a plurality of pet amusement devices illustrated in a stacked arrangement for storage or shipment purposes.

DESCRIPTION OF THE PREFERRED EMBODIMENT

Referring to FIG. 1, the novel pet amusement apparatus of the present invention is illustrated in the general direction of arrow 10 and includes contiguous sidewalls 11, 12, 13 and 14 which are joined at their respective corners in an end-to-end relationship. The adjacent ends of the sidewalls are secured together by any suitable means such as a length of pressure sensitive tape 15. Preferably, the adjacent ends of the sidewalls are arranged at right angles to each other so that a square or rectangular enclosure is produced which defines an internal cavity between the opposing inner wall surfaces of the sidewalls. However, other configurations may be employed such as circular, for example. The sidewalls are interconnected by means of a base panel 16 which is suitably secured along the edges of the sidewalls. In one form, the sidewalls are integrally formed with the panel 16 and merely folded about the sides and ends thereof. The base 16 includes a central opening 17 which is preferably large enough to accommodate passage of the pet therethrough.

Opposite sidewalls 11 and 13 are formed with semicircular cuts 20 and 21 which are coaxial with respect to each other and extend from the edge of the sidewalls opposite to their edge connected by base 17 and that extend substantially into the body of each of the respective sidewalls so as to provide a pair of openings adapted to accommodate passage of the body of the animal.

Opposing sidewalls 12 and 14 include semicircular openings 22 and 23 which are not coaxial and which are offset from each other on opposite sides of a center line extending across the device. The openings defined by the semicircular cuts 22 and 23 are substantially smaller than the openings defined by semicircular cuts 20 and 21. These latter openings are intended to accommodate an extremity of the animal, such as a paw or leg, and also serve as observation ports for viewing externally of the device.

In the position as shown in FIG. 1, the device may be employed not only as an amusement device for the animal but as a bed. To this end, a floor partition 24 is included which is disposed within the cavity and has its peripheral edges pressed against the inner surface of the sidewalls so as to be completely disposed within the cavity. The floor partition 24 is provided with integrally formed spacers 25 and 26, as shown more particularly in FIG. 2, which raise the floor partition 24 above the base panel 16. The space between the inserted floor partition and the ground supporting surface for the base panel 16 serves to establish an air insulation area. If desired, a cushion or pillow may be installed on the partition 24 for the comfort of the animal.

Referring to FIG. 3, it can be seen that the floor partition 24 includes a pair of V-shaped elements forming the spacers 25 and 26. The elements may be folded upon each other respectively so as to support the floor partition 24 as shown in FIG. 2. Preferably, the floor partition 24 may be fabricated from materials such as corregated cardboard and the V-shaped elements may be readily formed by providing score lines 27 and 28 which are arranged in parallel spaced-apart relationship and are formed along the edge-marginal region of the opposite ends of the partition. The material of the edge-marginal region extending between the extreme end of the partition and the score lines may be provided with second score lines, such as is indicated by numerals 30 and 31 so that the material may be folded over upon itself again to provide sufficient thickness for establishing the insulating space between the base panel 16 and the partition 24 as shown in FIG. 2.

When the embodiment of the present invention present invention is used as shown in the drawing of FIG. 1, the animal, such as a cat or dog, may use the device as a bed. Entrance into the internal cavity of the device may be through the top, which is open, or through the cutout openings 20 and 21. Once the animal is within the enclosure of the sidewall, the animal may use the cutouts 20 and 21 as well as cutouts 22 and 23 for observation outside of the sidewall enclosure and for extending its paw or leg for cuffing during play with another article such as a string or other amusement device.

Referring now to FIG. 4, the device has been reversed and the floor partition 24 removed so that the exposed edge of the continuous sidewall rests upon a supporting structure, such as the floor of a room. Entrance and exit to and from the internal cavity enclosed by the sidewall or sidewall portions and the base 16 can be achieved via cutout openings 20 and 21 and opening 17. These latter cutouts and opening 17 are of sufficient diameter to accommodate passage of the body of the animal. However, cutouts 22 and 23 are of reduced diameter to block passage of the animal. These latter cutouts may be employed for "peek holes" or for accommodating the extension of a leg or paw for play purposes.

Referring now to FIG. 5, it is to be noted that the continuous sidewall of the device 10 is tapered outwardly from the base panel 16. This construction established the end of the device carrying the base panel as being being narrower and shorter in dimension than the opposite end defined by the exposed edge of the sidewall. For purposes of clarification, the continuous sidewall is indicated by numeral 32 that extends around the base panel 16. Because of the outward taper of the sidewall, a plurality of devices may be stacked for storage or shipment purposes.

Preferably, the composition of the device may be cardboard, wood, synthetic materials, plastic or the like. In one form, the base panel 16 and the sidewall may be integrally formed from a flat blank in which each of the sidewall portions indicated by numerals 11—14 inclusive are integrally formed with one side of the base panel so that the sidewall portion may be folded to extend from one side of the base panel. The tape 15 may then be applied to the ends of adjacent sidewall portions so as to establish a corner. The resultant construction represents a boxlike structure having an open end defined by the exposed edges of the sidewall which are on the opposite side of the device from the edges of the sidewall integrally formed with the base panel. For this type of fabrication, cardboard has been found to be successful since the fold lines for bending or folding the sidewall portions with respect to the base panel may be readily defined by providing a score line.

Furthermore, it is to be understood that the boxlike structure of the device may take additional shapes and configurations such as may be represented by a house, building, miniature mountain or other similar structure of an imaginary, natural or animated character. It is within the concept of the present invention to place the floor partition 24 midway between the top and the bottom of the device so as to provide simulated rooms of a house wherein the cutouts may represent windows, doors or other openings. To this end, a roof may be employed which would totally or partially close the opening through the top of the device.

In view of the foregoing, it can be seen that the pet amusement device of the present invention provides a structure useful for entertaining and amusing a pet. The natural curious instincts of the animal are heightened by the cutouts and the placement of the cutouts with respect to each other as well as the exposed edge of the sidewall. Additionally, the device may be employed as a bed for the animal. Whether the device is used as a bed or as a play den, the opportunity for amusement and entertainment of the pet is afforded by the cutouts.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A pet amusement device comprising:
a base panel having a central opening formed therein;
an endless sidewall carried about the perimeter of said base panel to define an inner cavity adapted to accommodate the pet;
said sidewall formed with a plurality of cutouts spaced apart along the edge of said sidewall defining the entrance to said inner cavity;
a floor partition insertably carried between opposing inner surfaces of said sidewall in close proximity to said base panel; and
spacers carried on the opposite ends of said floor partition engageable with said base panel to define an air insulation area between said floor partition and said base panel.

2. The invention as defined in claim 1 wherein each of said cutouts is semicircular in configuration.

3. The invention as defined in claims 2 wherein a selected pair of said cutouts are coaxially on opposite sides of said sidewall.

4. The invention as defined in claim 3 wherein another selected pair of said cutouts are formed in said sidewall between said first selected pair of cutouts respectively.

5. The invention as defined in claim 1 wherein said sidewall is tapered outwardly with respect to said base panel so as to accommodate stacking of a multiplicity of said devices.

6. The invention as defined in claim 1 wherein said base panel is substantially square and said sidewall includes four wall portions connected together in end-to-end relationship and at right angles with respect to adjacent wall portions.

7. The invention as defined in claim 1 wherein
said sidewall is integrally formed with said base panel so as to constitute a blank whereby said sidewall is folded with respect to said blank to extend from one side of said base panel; and
said sidewall and said base panel forming a boxlike structure fully open at its end opposite to its end carrying said base panel.

8. A pet amusement apparatus comprising:

a boxlike structure having a bottom and a continuous sidewall having an exposed edge defining an opening into an internal cavity defined by the inner wall surface of said sidewall and said bottom;

said bottom formed with a central opening and said sidewall formed with a plurality of cutout openings in communication with said sidewall edge; and said sidewall cutouts being of different sizes wherein selected ones of said sidewall cutouts and said bottom opening are adapted to accommodate passage of the pet while the other of said sidewall cutouts are adapted to accommodate passage of body extremities of the pet.

9. The invention as defined in claim 8 wherein said sidewall comprises four sidewall portions arranged in opposing pairs in parallel relationship so as to provide four corners; and securement means for securing said sidewall portions together at said corners.

10. The invention as defined in claim 8 wherein said sidewall is tapered outwardly from said bottom so as to permit a plurality of said structures to be nested together in a stacked arrangement.

11. The invention as defined in claim 8 including a floor partition disposed in said cavity; and means carried on said partition supporting said partition on said bottom in fixed spaced relationship.